United States Patent [19]

Arakawa

[11] Patent Number: 5,408,610
[45] Date of Patent: Apr. 18, 1995

[54] COMMUNICATION CONTROL APPARATUS WHICH COMMUNICATES MANAGEMENT INFORMATION IN A COMMUNICATION SYSTEM

[75] Inventor: Tadashi Arakawa, Machida, Japan

[73] Assignee: Canon Kabushiki Kaisha, Tokyo, Japan

[21] Appl. No.: 22,602

[22] Filed: Feb. 17, 1993

Related U.S. Application Data

[63] Continuation of Ser. No. 352,900, May 17, 1989, abandoned.

[30] Foreign Application Priority Data

| May 18, 1988 | [JP] | Japan | 63-119335 |
| May 26, 1988 | [JP] | Japan | 63-127104 |
| Jun. 27, 1988 | [JP] | Japan | 63-156930 |

[51] Int. Cl.$^6$ .................. G06F 13/37; H04J 3/02
[52] U.S. Cl. .................. 395/200; 370/85.5; 340/825.05; 364/DIG. 1; 364/241.8; 364/242.94; 364/284; 364/284.3; 364/284.4
[58] Field of Search ........ 364/200, 900; 395/200; 370/85.15, 85.5, 16, 16.1; 340/825.05, 825.07

[56] References Cited

U.S. PATENT DOCUMENTS

| 4,507,777 | 3/1985 | Tucker et al. ............ 370/16 |
| 4,677,615 | 6/1987 | Orimo et al. ............ 370/89 |
| 4,747,100 | 5/1988 | Roach et al. ............ 370/85.5 |
| 4,827,411 | 5/1989 | Arrowood et al. ............ 395/200 |
| 4,829,516 | 5/1989 | Orimo et al. ............ 370/88 |
| 4,836,317 | 6/1989 | Straussmann ............ 178/2 R |
| 4,881,074 | 11/1989 | Reichbauer et al. ............ 340/825.05 |
| 5,003,533 | 3/1991 | Watanabe ............ 370/85.5 |
| 5,101,348 | 3/1992 | Arrowood et al. ............ 395/200 |

Primary Examiner—Paul V. Kulik
Attorney, Agent, or Firm—Fitzpatrick, Cella, Harper & Scinto

[57] ABSTRACT

First, second and third communication control apparatus are arranged in a logic ring, with management information, such as address information, being transmitted in a data packet transmitted around the ring. When the received packet data includes management information of the apparatus that has just received it, that information is deleted. On the other hand, when the received packet data does not include management information of the receiving apparatus, management information of the receiving apparatus is added to the packet data. In this way, the management information can be updated for all the apparatus in a simple fashion and in a short amount of time.

6 Claims, 10 Drawing Sheets

| K | ADDRESS C | ADDRESS B | #A | AA | #B | BB | FCS |

FIG. 6

| K | ADDRESS A | ADDRESS E | #A | AA | #B | BB | #C | CC | #D | DD | #E | EE | FCS |

FIG. 7

| K | ADDRESS A | ADDRESS E | #B | BB | #C | CC | #D | DD | #E | EE | FCS |

FIG. 8

| K | ADDRESS E | ADDRESS D | #E | EE | FCS |

FIG. 9

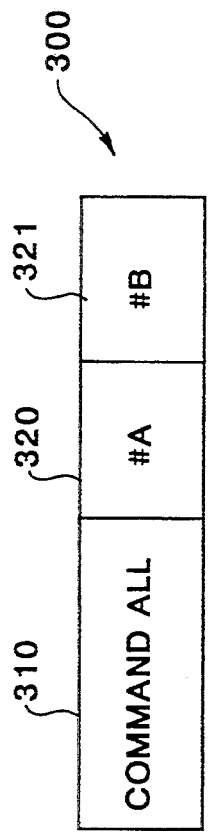
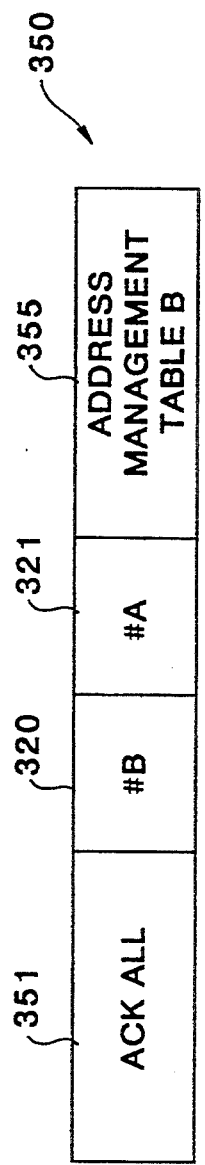
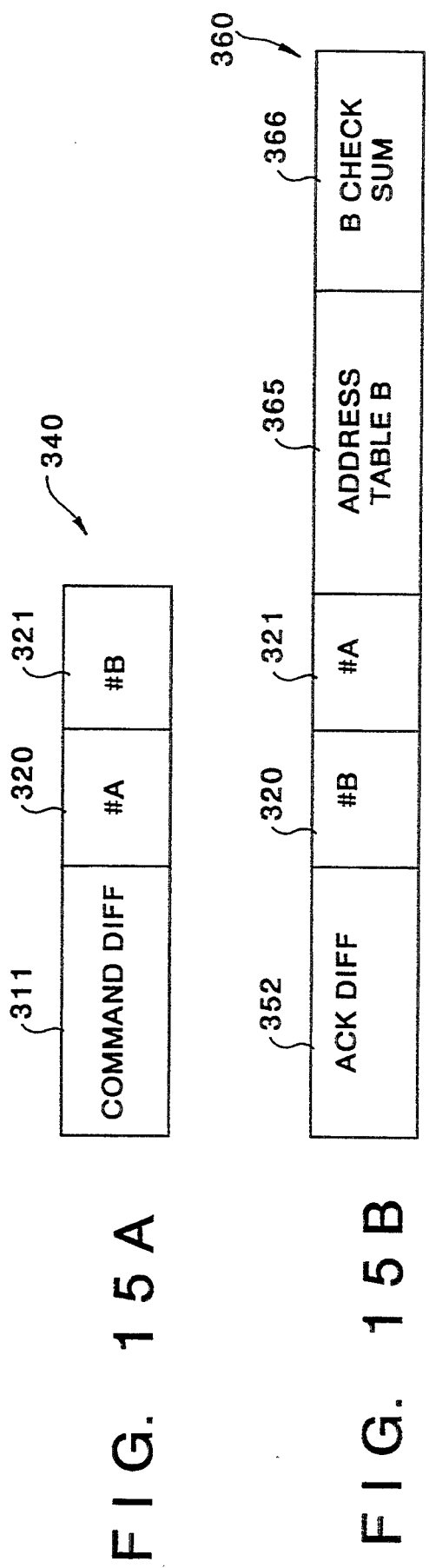

COMMUNICATION CONTROL APPARATUS WHICH COMMUNICATES MANAGEMENT INFORMATION IN A COMMUNICATION SYSTEM

This application is a continuation of application Ser. No. 07/352,900 filed May 17, 1989, now abandoned.

BACKGROUND OF THE INVENTION

1. Field of the Invention

The present invention relates to a communication system having a management server function and performing communication by a token access method or a communication system in which host computers to which subsystems are connected are connected to each other through a wide-area network, and electronic mail communication is performed between the subsystems connected to the host computers.

2. Description of the Prior Art

FIG. 2 shows a ring-coupled LAN (Local Area Network) of a general token access method.

FIG. 2 illustrates a state wherein medium access control is performed by a so-called token access method in which communication control apparatuses A to E each called a node are logically coupled in a ring shape, and only an apparatus having a token as a communication right assignment command has the right of transmission. In FIG. 2, five nodes, i.e., A to E are connected by a logic ring. For example, for the node C, the node B serves as an upstream node, and the node D serves as a downstream node.

Such a LAN is generally called a token ring, and is a world-wide standard as defined by ISO.8802/5. For this reason, its detailed description will be omitted. Network management in this LAN is basically performed as follows.

Each node performs own-node management, and a device called a network management server arranged in a given node acquires each management information. A network manager grasps/understands the acquisition result, and performs corresponding processing as needed.

Note that management information herein means, e.g., logging information, statistical information, format information, and the like.

However, some user systems are not equipped with a network management server. In general, each node incorporates a simple network management server function to acquire information within a limited range.

As a conventional acquisition means of management information, each node transmits a command requesting for transfer of intra-node management information of other nodes to the other nodes by multi-address calling periodically or as needed, and sequentially receives corresponding management information from the other nodes.

However, in a user system without a network management server, since each node randomly requests management information of other nodes, many management packets are generated in the LAN. For this reason, transfer efficiency (information volume transferred in a unit time) of user data is decreased.

A wide-area network system using a LAN system has a similar problem.

FIG. 17 shows a wide-area network system using the general LAN system.

In FIG. 17, four intra-area subsystems A 30, B 40, C 50, and D 60 are connected to a wide-area network 20 through host computers A 31, B 41, C 51, and D 61, respectively.

Each of the intra-area subsystems 30 to 60 is constituted by the LAN shown in FIG. 2, and a plurality of terminals T 32 to 65 are connected to the corresponding host computers A to D (31 to 61).

Each terminal can perform electronic mail communication with a terminal in another intra-area subsystem connected to another host computer through its own host computer and the wide-area network 20. For example, when the terminal 34 in the subsystem A 30 sends an electronic mail to the terminal 65 in the subsystem D 60, electronic mail transmission is executed in the following procedure.

First, the terminal 34 requests an electronic mail registered user list in the subsystem D 60 to the host computer A 31, and obtains the electronic mail registered user list obtained by a method to be described later. The terminal 34 determines the address value of the terminal 65 on the basis of the obtained electronic mail registered user list, and sends an electronic mail having the determined address value as a header to the host computer A 31.

The host computer A 31 recognizes on the basis of the header that the electronic mail is addressed to a terminal in the subsystem D 60, and adds a header addressed to the host computer D 61 to the electronic mail and sends it onto the wide-area network. The packet received at the host computer D 61 is sent to the terminal 65 via the LAN in the subsystem D 61.

In order to smoothly operate an electronic mail system, addresses of electronic mail registered users managed by each host computer must include not only those in its own subsystem but also those in all the subsystems connected to the wide-area network.

More specifically, the host computer A 31 must manage not only addresses of in the subsystem A 30 but also addresses of all the terminals in the subsystems B 40, C 50, and D 60. The addresses to be managed must always be the latest addresses in correspondence with all changes in system.

As a conventional method of updating an address table, the following two methods are known.

In a first method, a manager of the entire system obtains latest address tables from managers of the subsystems, and stores them in a recording medium such as an MT (magnetic tape), and sends the record by mail to the host managers of the subsystems periodically (once a month), so that the manager of each host computer updates its own address table.

A second method is performed by inter-host communication utilizing the wide-area network. In this method, a manager of, e.g., the host computer A 31 transmits the latest address table of the subsystem A 30 to all the remaining host computers B 41, C 51, and D 61, so that each host computer updates the address table associated with the subsystem A 30.

However, the first and second conventional methods have the following problems.

In the first method, since an updating cycle is long, a new user who wants registration must wait for a long period of time until the address table is updated, and cannot enjoy electronic mail service during this period.

If the updating cycle is shortened, the manager of the entire system and the managers of the subsystems are overloaded.

In the second method, the number of communications required for updating is increased, and as a result, communication fee charged to users is increased.

For example, when host computers are scattered at 100 locations, 9,900 inter-host communications are required for all the host computers to complete updating of the entire system.

SUMMARY OF THE INVENTION

It is an object of the present invention to provide a communication system which can eliminate the conventional drawbacks.

It is another object of the present invention to provide a communication system which can update management information among a plurality of communication control apparatuses at high speed with a small communication volume.

It is still another object of the present invention to provide a communication system which can update management information among a plurality of communication apparatuses at low cost.

The present invention comprises the following arrangement as a means for attaining the above objects.

More specifically, there is provided a communication control apparatus which is connected to a communication system having a management server function and performing communication by a token access method, comprising: receiving means for receiving management information request packet from an upstream apparatus; discriminating means for discriminating whether or not communication control apparatus management information in the packet received by the receiving means includes management information of its own apparatus; deleting means for, when the discriminating means discriminates that the communication control apparatus management information includes its own apparatus management information, deleting its own apparatus management information from the received packet; adding means for, when the discriminating means discriminates that the communication control apparatus management information does not include its own apparatus management information, adding management information of its own apparatus to the received packet; and transmitting means for transmitting the received packet to a downstream apparatus.

With the above arrangement, updating of the communication control apparatus management information can be completed by a considerably smaller number of packet transfers, less than two rounds for a ring as compared to a conventional case wherein the multi-address calling is performed. Thus, the management information can be updated with almost no decrease in transfer efficiency of user data.

Furthermore, in a system in which electronic mail communication is performed among subsystems connected to a wide-area network through corresponding host computers, all the host computers are arranged on a virtual ring, and each host computer comprises: receiving means for receiving an address information updating packet transmitted from an upstream host computer of the virtual ring; table updating means for updating an internal address table in accordance with information of the address information updating packet received by the receiving means; discriminating means for discriminating whether or not the address information updating packet received by the receiving means includes address updating information of its own host computer; address information updating means for, when the discriminating means discriminates that the address updating information of its own host computer is included, deleting the address updating information from the packet, and for, when the discriminating means discriminates that the address updating information of its own host computer is not included, adding the address updating information to the packet; and transmitting means for transmitting the packet to a downstream host computer of the virtual ring.

With the above arrangement, all the latest address updating information can be provided to all the host computers with a small communication volume.

The host computer further comprises: transmitting means for transmitting at least two types of address information request commands to another host computer; first send-back means for, when a first address information request command is received from another host computer, sending back all the address information in a subsystem of its own host computer to the address information request command transmitting host computer; and second send-back means for, when a second address information request command is received from another host computer, sending back information consisting of error detection data and address change information in the subsystem of its own host computer to the address information request command transmitting host computer.

With the above arrangement, the address information request command transmitting host computer can obtain the latest address in a desired subsystem and information corresponding to the address with a minimum communication data volume.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows a packet format of a packet P2 used in the first embodiment;

FIG. 7 shows a packet format of a packet P5 used in the first embodiment;

FIG. 8 shows a packet format of a packet P6 used in the first embodiment;

FIG. 9 shows a packet format of a packet P9 used in the first embodiment;

FIGS. 14A and 14B and FIGS. 15A and 15B show transmission frame formats used in the third embodiment, in which
FIG. 14A shows a "command ALL"packet,
FIG. 14B shows a "Ack ALL"packet,
FIG. 15A shows a "command DIFF"packet,
and
FIG. 15B shows a "Ack DIFF"packet.

DETAILED DESCRIPTION OF THE PREFERRED EMBODIMENTS

An embodiment of the present invention will be described in detail hereinafter with reference to the accompanying drawings.

(First Embodiment)

Figure 1:
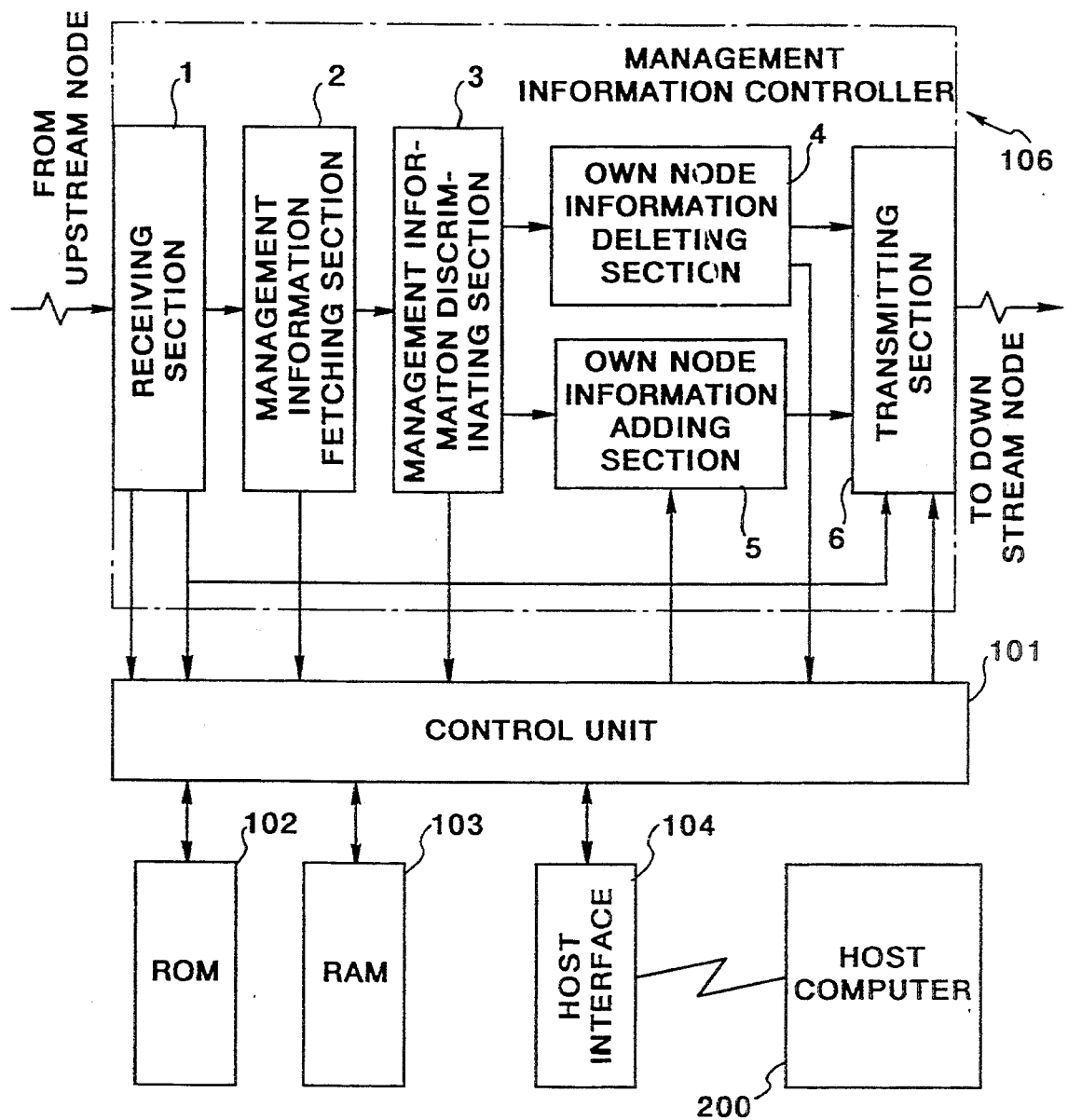
FIG. 1 is a block diagram of a first embodiment according to the present invention.
Figure 2:
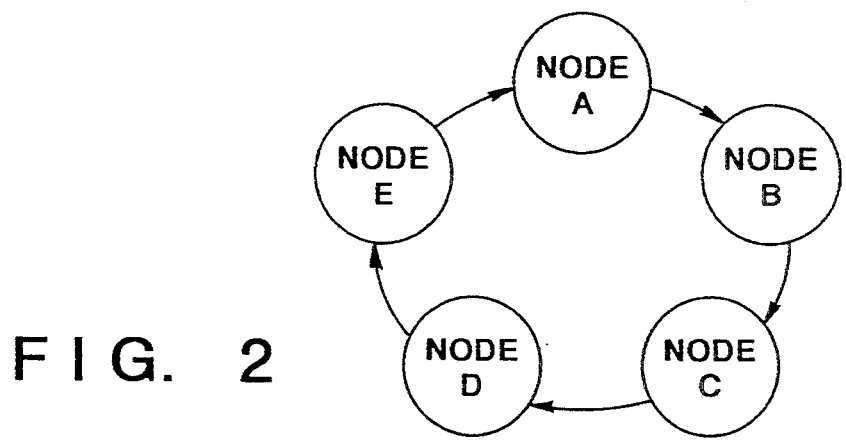
FIG. 2 is a view showing an arrangement of a general token ring communication system.

FIG. 1 is a block diagram of an embodiment of the present invention, e.g., a management controller of management information in a node in the LAN shown in FIG. 2. Nodes A to E of this embodiment each having the arrangement shown in FIG. 1 constitute a token ring LAN having a management server function.

In FIG. 1, reference numeral 100 denotes a management information controller of a node connected to a host computer 200; 101, a control unit for controlling the entire node including the management information controller 100 in accordance with a control procedure stored in a ROM 102; 102, the ROM storing the above-mentioned control procedure, and the like; 103, a RAM for temporarily storing management information of the network and reception data or transmission data at the management information controller 100; 104, a host interface connected to the node or for interfacing with the host computer 200 for performing various information processing including the node function; and 200, the host computer.

In the management information controller 100, reference numeral 1 denotes a receiving section for receiving management information request packet from an upstream node and transmitting it to a management information fetching section 2 and the control unit 101; 2, a management information fetching section for separating and reading out management information of a node added to the packet received at the receiving section and fetching it into an own node; 3, a management information discriminating section for determining whether or not management information in the packet fetched by the management information fetching section 2 is added with management information of its own node (receiving node) and informing the discrimination result to the control unit 101; 4, its own node information deleting section which is enabled when the management information discriminating section 3 discriminates that the management information of its own node is included, deletes the management information of its own node from the management information of the received packet, and sends the packet to a transmitting section 6; 5, own node information adding section which is enabled when the management information discriminating section 3 discriminates that the management information of its own node is not included, reads out the management information of its own node stored in the RAM 103 and adds it to the received management information, and sends it to the transmitting section 6;

and 6, the transmitting section for generating a transmission packet including new management information from which the management information of its own node is deleted by its own node information deleting section 4 or new management information added with the management information of its own node by its own node information adding section 5, transmission packet data sent from the control unit 101, and the like, and transmitting the generated packet to a downstream node.

Figure 3:
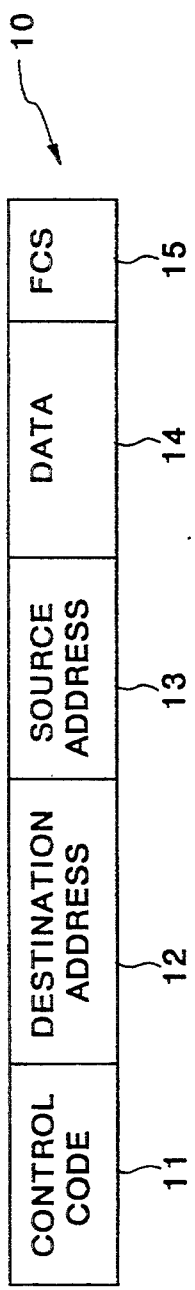
FIG. 3 shows a packet format used in a LAN of the first embodiment.

FIG. 3 shows a packet format of a packet flowing through the token ring shown in FIG. 2 of this embodiment with the above arrangement.

In a packet (10) shown in FIG. 3, reference numeral 11 denotes a control code for uniquely determining a meaning of the corresponding packet; 12, a destination address of a final receiver (destination) node of the corresponding packet; 13, a source address indicating an address of a node transmitting the corresponding packet; 14, data transmitted using the packet; and 15, a frame check sequence FCS Note that the logic ring shown in FIG. 2 has a ring structure of the node A node B node C node D node E node A. As shown in FIG. 2, these nodes serve as downstream hosts in turn in accordance with the direction of arrows " ". For example, an upstream node of the node B is the node A, and its downstream node is the node C.

Management information updating control of this embodiment with the above arrangement will be described below with reference to the management information control flow shown in FIG. 4, and the like.

Figure 4:
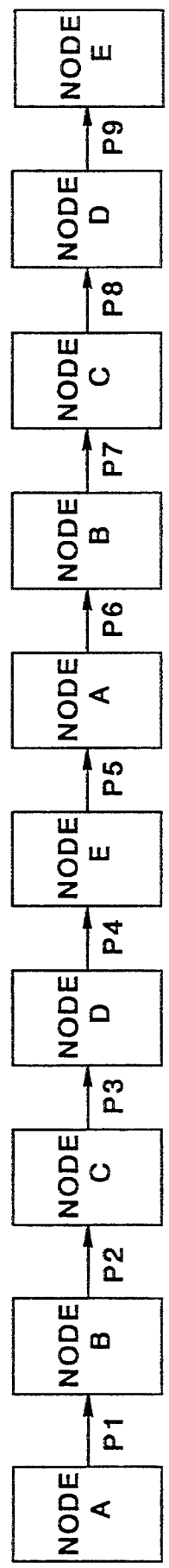
FIG. 4 is a flow showing management information updating processing of the first embodiment.

In FIG. 4, P1 to P9 arrows represent the order of packets flowing on the logic ring.

Figure 5:
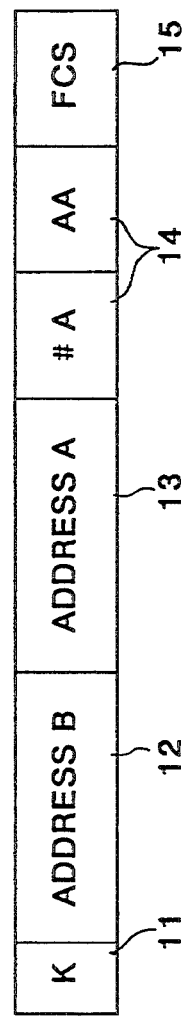
FIG. 5 shows a packet format of a packet P1 used in the first embodiment.

First, the node A issues a packet P1 for requesting management information to the node B. FIG. 5 shows the packet format of the packet P1.

In FIG. 5, the node A sets "K"as a command code for requesting management information in the control code 11, sets the address of node B as the downstream node from its own node as the destination address 12, and sets its own node address as the source address 13. Node A stores information of "#A" and "AA" in the data field 14, and calculates the FCS. Node A adds the calculated FCS to the packet and transmits the packet to node B.

Note that "#A" indicates an address of node A and a byte length of "AA", and "AA" is management information of node A.

Node B which receives the packet P1 checks the control code 11 of the received packet. Since the control code 11 is "K" node B can detects that a packet requesting management information is received. Thus, node B causes its management information fetching section 2 to fetch management information from the data field 14 in the packet received at the receiving section 1. Node B can obtain the management information of node A, and updates the management information of node A which is managed in node B and is stored in the RAM 103.

Since no information other than the management information of node A is added to the received packet, updating processing is ended. Since the management information discriminating section 3 discriminates that the management information of its own node B is not in the received packet, its own node information adding section 5 is enabled, and the control unit 101 adds its own node management information held in the RAM 103 of its own node into the data field 14 of the received packet to generate a packet P2 addressed to the downstream node C. Packet P2 is transmitted from the transmitting section 6 to the node C.

FIG. 6 shows the format of the packet P2.

In the packet P2, the control code is "K" as in FIG. 5, and the destination address 12 and the source address 13 are respectively those of the node C and the node B. In the data field 14, "#B" indicating the address of node B and the byte length of "BB", and "BB" as the management information of node B are newly added after "#A" and "AA".

Node C which receives packet P2 can obtain the management information of nodes A and B, and can update those of nodes A and B. With a similar flow of control, node C generates a packet P3 to which an address, the byte length of management information, and the management information of its own node are newly added in the data field 14, and transmits it to node D.

Node D which receives the packet P3 can update the management information of nodes A, B, and C. With a similar flow of control, node D generates a packet P4 to which an address, the byte length of management information, and the management information of its own node are newly added in the data field 14, and transmits it to node E.

Node E which receives the packet P4 can update the management information of all the remaining nodes A, B, C, and D connected to the LAN. With a similar flow of control, node E generates a packet P4 to which an address, the byte length of management information, and the management information of its own node are newly added in the data field 14, and transmits it to node A.

Since the data field 14 of this packet P5 stores the management information of all nodes A to E, as shown in FIG. 7, node A which receives this packet P5 can update the management information of nodes B, C, D, and E as all the remaining nodes connected to the LAN. Since this received packet includes the management information of its own node, the management information discriminating section 3 enables its own node information deleting section 4 to generate a packet P6 shown in FIG. 8 having a new data field 14 from which the address, the byte length of the management information, and the management information of its own node is deleted from the data field 14 of the received packet. The packet P6 is transmitted to node B.

Node B which receives the packet P6 fetches the management information of nodes C, D, and E as the nodes excluding node A whose management information has already been updated from the data field 14 of the received packet P6, and can update management information of the corresponding nodes in its own node. Note that since the management information of node A has already been updated by the packet P1, all the updating operations at node B are completed.

In node B, since the management information in the data field 14 includes the management information "BB" its own node, this information is deleted by its own node information deleting section 4 as in node A. Then, a new transmission packet P7 is generated and is transmitted to the node C.

A similar deleting operation is performed in nodes C and D, and a packet P9 sent from node D to node E via the packets P7 and P8.

FIG. 9 shows the format of the packet P9. Since the management information of nodes A to D have already been deleted by the corresponding nodes, the packet P9 is added with only the management information of node E. Node E has already updated the management information of nodes A, B, C, and D by packet P4 shown in FIG. 7, and there is no additional information to be updated using packet P9. Node E deletes "#E" and "EE" as the management information of its own node in the data field 14. As a result, the data field 14 in the packet disappears, and the packet has played its role. Therefore, there is no packet sent from node E to node A, and all the communication operations of management information are completed.

As described above, according to the present invention, updating of management information of each node can be completed by a considerably smaller number of packet transfers of less than two rounds around the ring as compared to the conventional case wherein multi-address calling is performed. In addition, the length of a transfer packet can be minimized. For this reason, updating of management information can be performed with almost no adverse influence on transfer efficiency of user data.

According to the present invention, updating of management information of another communication control apparatus in a communication control apparatus can be performed with a small communication volume.

(Second Embodiment)

Figure 10:
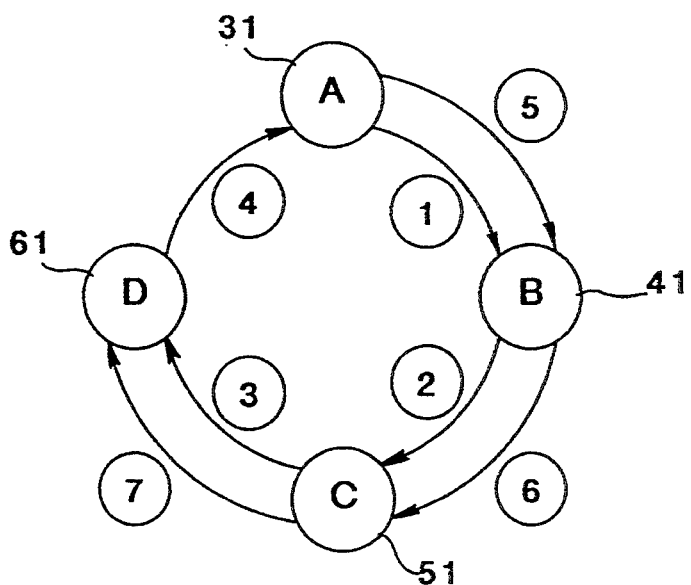
FIG. 10 shows a logic ring of a wide-area electronic mail system according to a second embodiment of the present invention.
Figure 17:
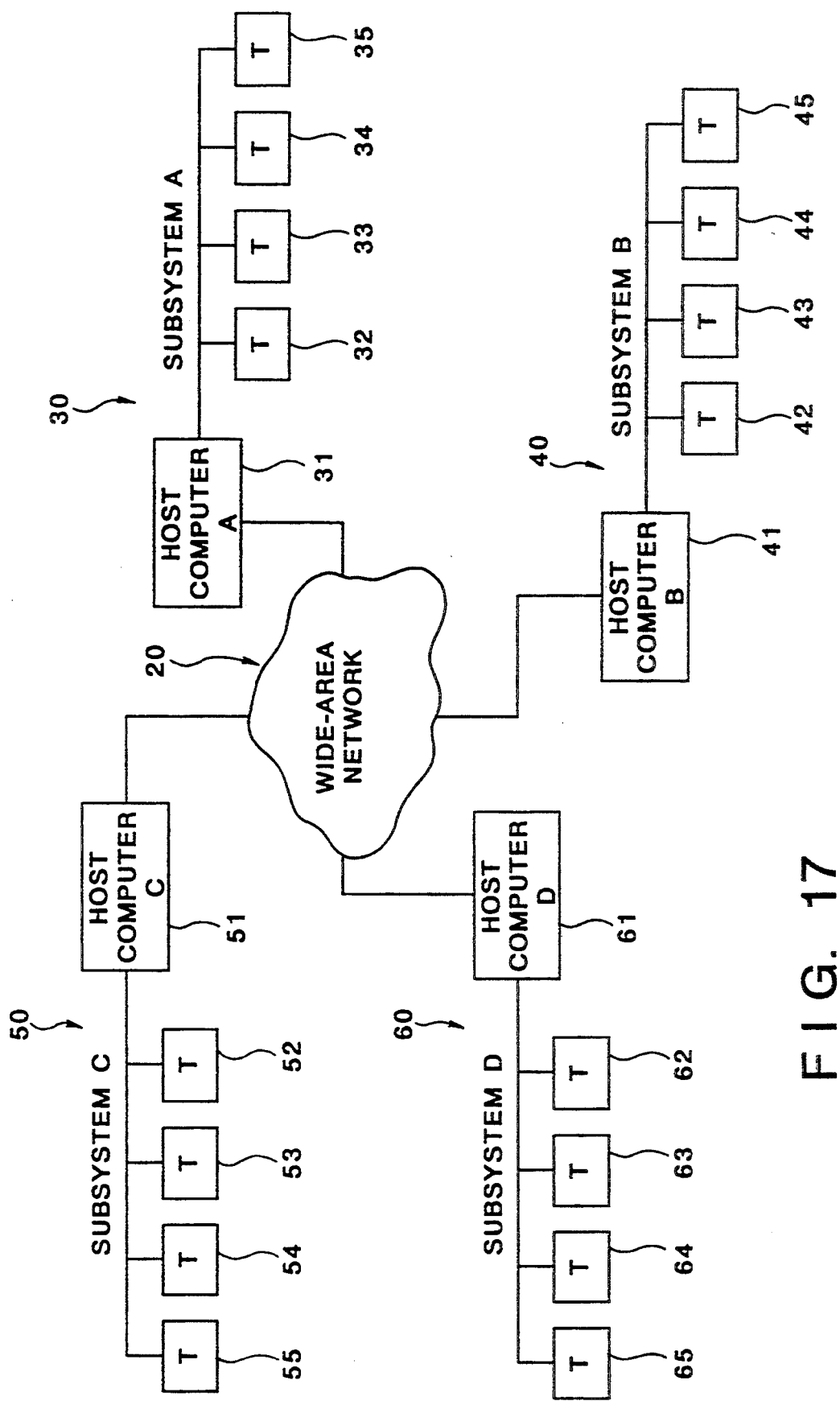
FIG. 17 is a diagram showing a general wide-area electronic mail system.

Updating of management information has been described. Updating processing of management information in the host computers A 31, B 41, C 51, and D 61 of intra-area subsystems connected to the wide-area network 20 shown in FIG. 17 can be similarly performed. In the wide-area network 20 shown in FIG. 17, a logic ring constituted by the host computers A to D is arranged as shown in FIG. 10. The logic ring has a ring structure like the host computer A 31 host computer B 41 host computer C 51 host computer D 61 host computer A 31. As shown in FIG. 10, the host computers serve as downstream host computers in turn in accordance with the direction of arrows "". For example, an upstream host Computer of the host computer B 41 is the host computer A 31, and its downstream host computer is the host computer C 51.

Numerals ① to ⑦ arrows in FIG. 10 indicate the order of packets flowing on the logic ring. More specifically, the host computer B 41 which receives a packet ① from the upstream host computer A 31 transmits a packet ② to the downstream host computer C 51. Similarly, the packet is transmitted to the downstream host computers in the order of the arrows. Finally, the host computer D 61 receives a packet ⑦ from the host computer C 51.

Figure 11:
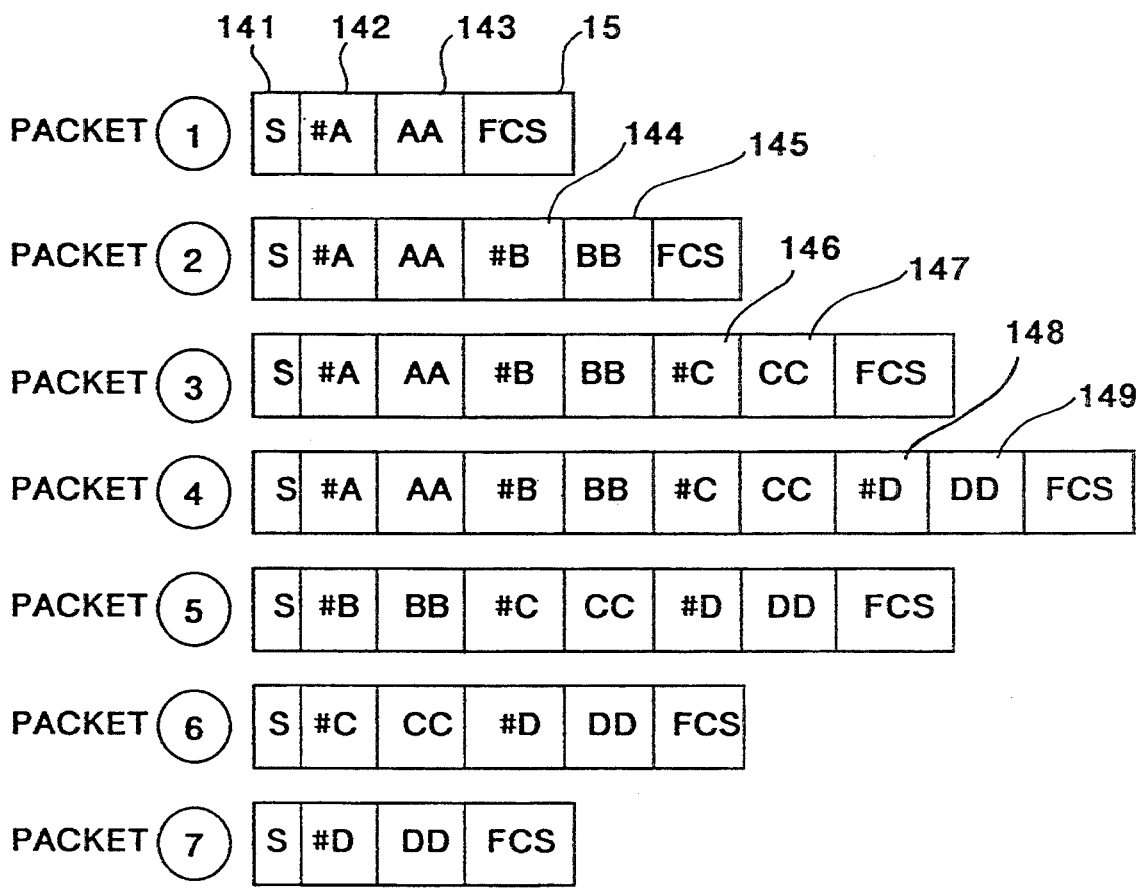
FIG. 11 shows packet formats exchanged among host computers of subsystems of the second embodiment.

FIG. 11 shows detailed formats of the packets transmitted on the logic ring described above.

FIG. 11 shows formats of respective portions of the packets ① to ⑦ transmitted on the logic ring.

In FIG. 11, "S" shown in a field 141 is a type code and the like of a packet, and consists of the control code 11, the destination address 12, and the source address 13 shown in FIG. 5. The control code 11 indicates that the corresponding packet is an address information updating packet. In the following data area, each host information, a byte length of the following address management table, and the address management table are stored. Finally, a frame check sequence FCS 15 is added.

In the data field, data #A 142 is host A information indicating a code of host computer A 31, and a byte length of the following data AA 143. Data AA 143 is an address management table in the subsystem A 30. Similarly, data #B 144 is host B information indicating a code of host computer B 41 and a byte length of the following data BB 145. Data BB 145 is an address management table in the subsystem B 40. Data #C 146 is host C information indicating a code of host computer C 51 and a byte length of the following data CC 147. Data CC 147 is an address management table in subsystem C 50. Data #D 148 is host D information indicating a code of host computer D 61, and a byte length of the following data DD 149. Data DD 149 is an address management table in subsystem D 60.

Figure 12:
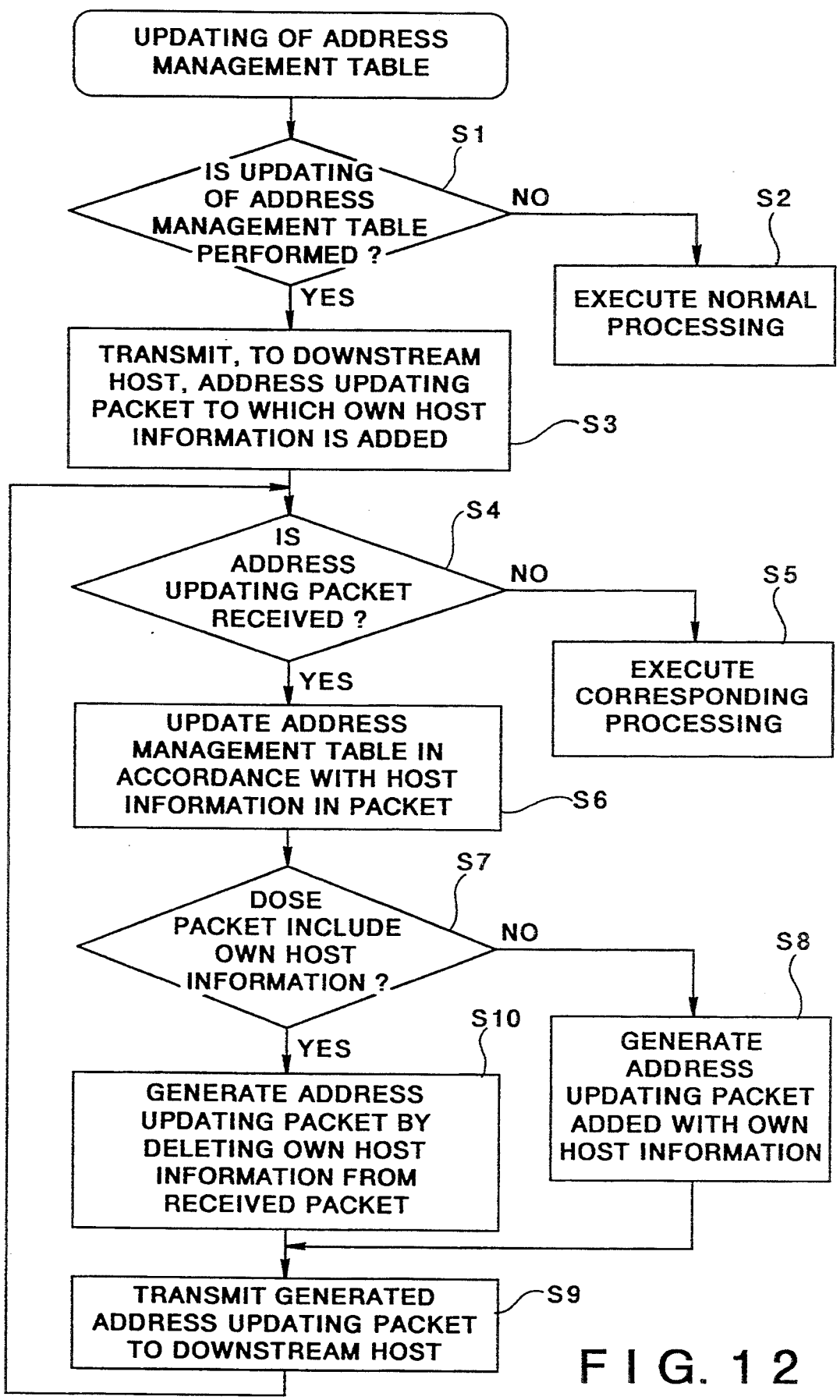
FIG. 12 is a flow chart for explaining address management table updating control of the second embodiment.

Address management table updating processing in which each host of this embodiment with the above arrangement updates the address management table of electronic mail registered users will be described below with reference to flow chart of FIG. 12. In the following description, host computer A 31 of the logic ring shown in FIG. 10 requests updating processing of the address management table. However, this control is similarly performed by other host computers. Furthermore, updating processing of an address management table in each node of the first embodiment described above is performed by the same control as that shown in FIG. 12.

In general, when the host computer does not want to update an address management table, the flow advances from step S1 to step S2, and normal communication processing is executed. In this normal processing, when the host computer wants to execute an update of the address management table, the flow advances from step S1 to step S3, and an address updating packet added with own host information is generated and transmitted to a downstream host computer (host computer B 41 when host computer A 31 starts address management table updating processing). In this case, the generated packet is one illustrated as packet ① in FIG. 11.

Host computer B 41 which receives packet ① checks the type code 141 of the received packet in step S4. If the type code 141 is "S", since the received packet is an address updating packet, the flow advances to step S6. If the type code 141 is not "S" another type of packet is received and processing corresponding to the received packet is executed in step S5. This processing is a known processing, and a detailed description thereof will be omitted.

If the type code 141 is "S" and the flow advances to step S6, the address management table of its own host computer is updated in accordance with the host information in the received address updating packet. Since host computer B 41 receives the packet ① shown in FIG. 11, it updates an address table associated with subsystem A 30 in host computer B 41 in accordance with the address updating information AA 143 of subsystem A 30.

It is then checked in step S7 to determine if the packet includes its own host information. In this case, since the host information is only "#A" associated with host computer A 31 and no code "#B" of its own host computer is included, the flow advances to step S8. In step S8, an address updating packet obtained by adding its own host information to the received address updating packet is generated. The generated packet is transmitted to a downstream node in step S9. In this case, the downstream host computer of host computer B 41 is host computer C 51, and packet ② shown in FIG. 11 is transmitted to host computer C 51. The flow then returns to the processing in step S4. Host computer C 51 receives the address updating packet, and executes the processing in steps S7, S8, and S9. In this case, host computer C 51 transmits an address updating packet illustrated as the packet ③ in FIG. 11 to host computer D 61.

Similarly, host computer D 61 transmits an address updating packet illustrated as the packet ④ in FIG. 11 to host computer A 31. Upon reception of this packet, host computer A 31 can detect the address updating information associated with the subsystems from all host computers connected to the network, and can update its address management table. Since it is determined in step S7 that the packet includes its own host information, the flow advances from step S7 to the processing in step S10, and an address updating packet obtained by deleting its own host information from the received packet is generated. The address updating packet is transmitted to host computer B 41 as the downstream host computer in step S9. In this case, the address updating packet illustrated as the packet ⑤ in FIG. 11 is transmitted.

Host computer B 41 which receives this packet updates its address management table by processing in steps S6, S7, S10, and S9. Thus, host computer B 41 can detect address updating information associated with subsystems from all host computers connected to the network together with host information of host computer A 31 which has already been updated, and can update its address management table.

Host computer B 41 generates an address updating packet illustrated as the packet ⑥ in FIG. 11, and transmits it to host computer C 51 as the downstream host computer. Host computer C 51 similarly updates its address management table, and transmits an address updating packet illustrated as packet ⑦ in FIG. 11 to host computer D 61 as the downstream host computer. Host computer D 61 which receives this packet deletes its own host information, i.e., deletes the address updating packet to cause it to disappear.

In the above description, after the processing in step S6 is executed, processing in step S8 or S10 is executed. Alternatively, processing in steps S7, S8, and S10 may be executed prior to the processing in step S6, and thereafter, the processing in step S6 may be executed.

In this case, host computer B 41 updates the address table associated with subsystem A 30 in host computer B 41 in accordance with the address updating information AA 143 of subsystem A 30. Thereafter, host computer B 41 adds address information BB 145, its byte length and host information #B 144 associated with subsystem B 40 in host computer B 41 after the received packet ① to generate the packet ②.

Host computer B 41 transmits packet ② to host computer C 51 as the downstream host computer. A similar operation is performed by host computers C 51 and D 61. Host computer C 51 updates information AA 143 and BB 145 using packet ② and host computer D 61 updates information AA 143, BB 145, and CC 147 using packet ③. Host computer A 31 which receives packet ④ obtains the information of BB 145, CC 147, and DD 149 to perform updating. Thus, host computer A 31 completes updating of all the table information.

Unlike the case of conventional packets ① to ③ packet ④ includes its own code 37#A". In this case, host computer A 31 generates a packet ⑤ from which all the information associated with subsystem A 30 is deleted. Host computer A 31 transmits packet ⑤ to host computer B 41. Similarly, host computer B 41 updates information CC and DD, and generates a packet ⑥ from which all the information associated with subsystem B 40 is deleted. Host computer B 41 then transmits the packet to host computer C 51. Host computer C 51 performs a similar operation, and updates information DD. Then, a final packet ⑦ is received by host computer D 61. Host computer D 61 performs a similar operation. In this case, since there is no updating data of other host computers, the updating operation is not performed. Since the information associated with system D is deleted, the address information updating packet itself disappears With the above operation, all the address management tables of host computers A 31 to D 61 are updated.

According to the above embodiment as described above, the address management tables of all the constituting host computers can be updated by circulation of a minimum, necessary number of address updating packets.

In a system having four subsystems, address information of the entire system can be updated by seven packet information.

In a system having a larger number of subsystems, e.g., 100 subsystems, the address information can be updated by 199 packet information. As can be apparent from this, this embodiment can provide an efficient updating method as compared to the prior art requiring 9,900 packet information.

With this embodiment, address information can be updated with low communication cost, and an updating frequency can be increased in terms of cost. Therefore, a change in electronic mail user registration can be quickly coped with.

As described above, according to the present invention, address information of the entire system can be updated by exchanging a small number of packet information.

Furthermore, the updating frequency of address information can be increased in terms of cost. Therefore, a change in electronic mail user registration can be quickly coped with.

(Third Embodiment)

Updating processing of network address management tables among the connection nodes/host computers in the nodes/host computers has been described. A host computer of each intra-area subsystem connected to the wide-area network 20 can comprise a network address management table in its own subsystem, and can also comprise of address management tables of subsystems connected to other host computers. Thus, control can be made such that an address value of a destination terminal in a desired subsystem is calculated in accordance with the management table, and a transmission packet is generated in accordance with the address value.

Figure 13:
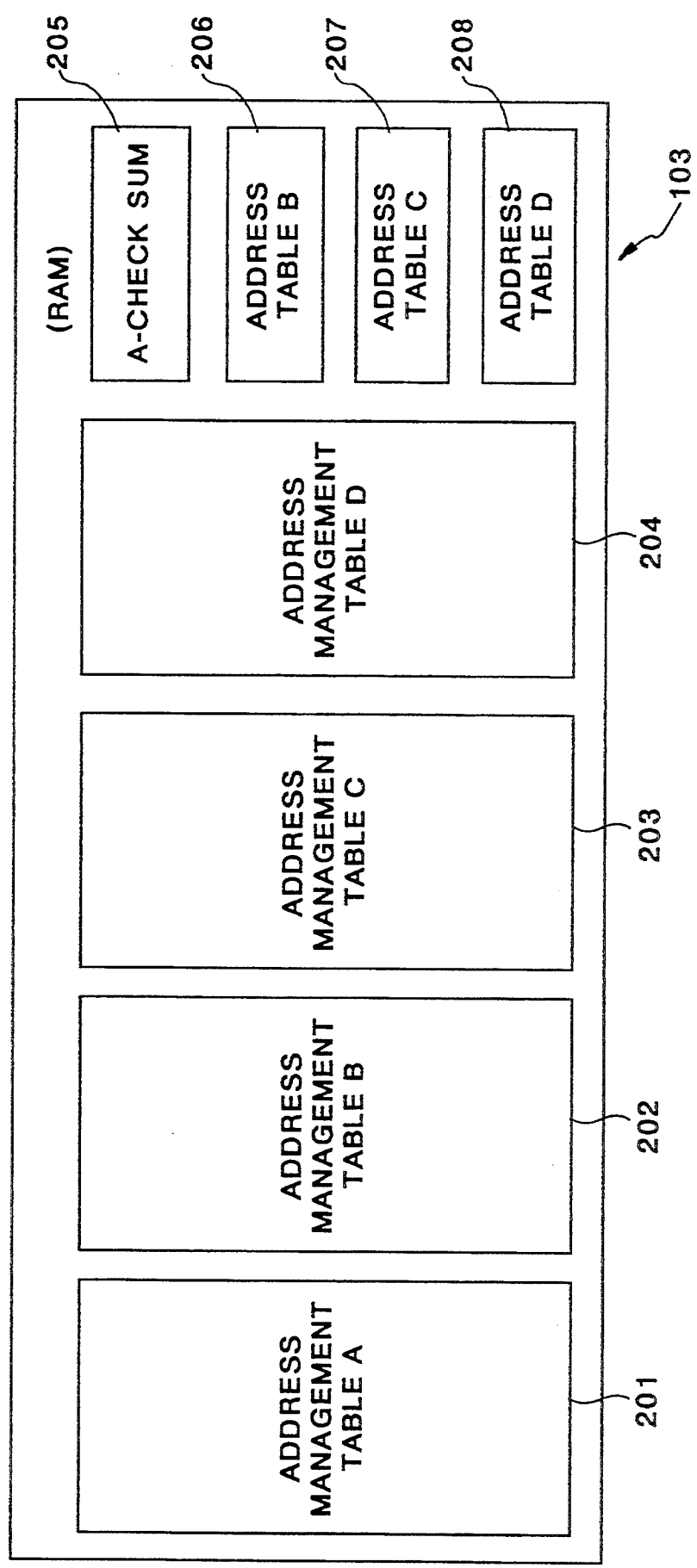
FIG. 13 is a view showing an address management state in memory of a host computer A according to a third embodiment of the present invention.

FIG. 13 shows a format of the network management table in a RAM 103 of each host computer. The format of the network management table in host computer A 31 to which subsystem A 30 is connected will be exemplified.

In FIG. 13, reference numeral 201 denotes an address management table (A-addr) for managing terminal addresses in subsystem A 30; 202, an address management table B (B-addr) for managing terminal addresses in subsystem B 40; 203, an address management table C (C-addr) for managing terminal addresses in subsystem C 50; and 204, an address management table D (D-addr) for managing terminal addresses in subsystem D 60.

In this embodiment, of the terminal address management tables of the subsystems connected to host computers, the address management table of its own subsystem undergoes special management as compared to other address management tables.

For example, host computer A 31 performs special management for address management table A 201.

More specifically, management data indicated by 205 to 208 in FIG. 13 are added.

Reference numeral 205 denotes a check sum value (A-checksum) of the address table of subsystem A 30; 206, an address table B representing a difference between the address management table A 201 of subsystem A 30 which was transmitted from the host computer A 31 to host computer B 41 during immediately preceding communication and the present address management table A 201 of subsystem A 30; 207, an address table C representing a difference between address management table A 201 of subsystem A 30 which was transmitted from host computer A 31 to host computer C 51 during immediately preceding communication and the present address management table A 201 of subsystem A 30; and 208, an address table D representing a difference between the address management table A 201 of subsystem A 30 which was transmitted from host computer A 31 to host computer D 61 during immediately preceding communication and the present address management table A 201 of subsystem A 30.

When the terminal addresses of the subsystem A 30 are changed (ΔAA), the address management table A 201 is updated, and the check sum re-calculated to update the check sum value 205.

On the basis of the change ΔA, the address tables B 206, C 207, and D 208 are updated.

If the entire address management table A 201 is transmitted to host computer B 41, there is no difference between the address management table A 201 in host computer A 31 and the address management table A 201 in host computer B 41. For this reason, the address table B 206 is reset. This also applies to host computers C and D.

The address management state in host computer A 31 has been described. This applies to remaining host computers B 41, C 51, and D 61.

More specifically, each host computer has the address management tables A 201, B 202, C 203, and D 204, check sum values of the address management tables, and the address tables A to D.

Exchange of address information among host computers which perform the above-mentioned address management is performed every time a command frame and a response frame are exchanged.

The format of a transmission frame used in this embodiment will be described below with reference to FIGS. 14A, 14B, 15A, and 15B.

A transmission frame 300 in FIG. 14A is a transmission frame format of a "command ALL" packet requesting transmission of all the address information in a destination subsystem.

Reference numeral 310 denotes a control frame indicating that this packet is the "command ALL" packet; and 320, a source frame indicating a source host computer which transmits the corresponding packet. In FIG. 14A, information "#A" indicating that host computer A 31 is a source computer is stored in the frame 320. Reference numeral 321 denotes a destination frame indicating a destination host computer.

The destination host computer which receives the "command ALL" packet (in this case, host computer B) sends back a response packet 350 including the address table A to the source host computer (in this case, host computer A).

In the response packet 350, reference numeral 351 denotes an "Ack ALL" control frame indicating that this packet is a packet including the address table; and 355, a data frame storing address table data.

In FIG. 14B, a source frame 320 stores "#B"indicating host computer B 41.

A destination frame 321 stores "#A" indicating host computer A 31.

For this reason, host computer A 31 transmits a similar "command ALL" packet to the host computers the corresponding address management tables of which are to be updated, and can obtain all the necessary address information in the destination subsystem.

In this embodiment, communication using packets shown in FIGS. 15A and 15B is also performed as well as the above communication.

FIG. 15A shows a "command DIFF" packet 340 which requests transmission of an address table of a subsystem of a desired host computer and its check sum value. In FIG. 15A, a control frame 311 stores data "command DIFF" indicating that this packet is the "command DIFF" packet.

Reference numerals 320 and 321 denote a source frame and a destination frame similar to those in FIG. 14A. In this case, the source frame 320 stores "#A" and the destination frame 321 stores "#B".

The destination host computer, e.g., host computer B 41 which receives the "command DIFF" packet 340 sends back a response packet 360 including address table data shown in FIG. 15B to the source host computer, e.g., host computer A 31.

In the response packet 360, a control frame 352 stores data "Ack DIFF", and its data frame includes address table B data 365 of host computer B 41 and its check sum (B-checksum) 366.

Control including updating processing of the address management tables of the host computers of this embodiment with the above arrangement will be described below with reference to FIGS. 16A and 16B.

A case will be exemplified below wherein a terminal of subsystem A 30 performs transmission processing with respect to a terminal of subsystem B 40.

Figure 16A:
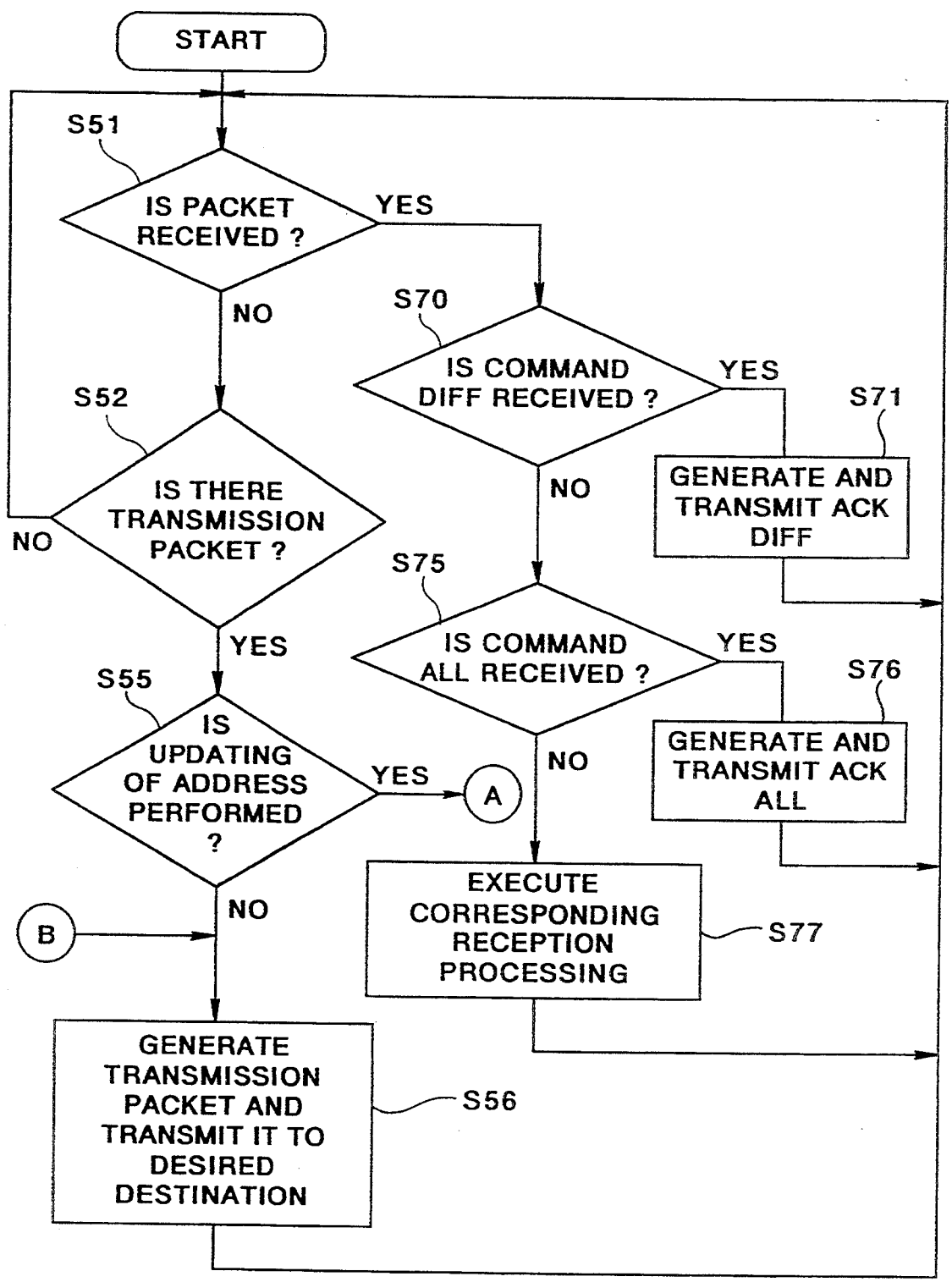
FIGS. 16A and 16B are flow charts showing address management table updating processing of the third embodiment.

In steps S51 and S52 in FIG. 16A, whether a packet is received or a transmission packet is generated is monitored.

When the terminal of subsystem A 30 performs transmission processing with respect to the terminal of subsystem B 40, a transmission request terminal designates a destination terminal, and sends transmission data to host computer A 31. Thus, a packet to be transmitted is generated in host computer A 31. For this reason, when no packet is received in step S51, the flow advances to step S52, and since the transmission packet is generated in step S52, the flow advances to step S55.

In step S55, host computer A 31 determines whether or not updating processing of the address management table in the destination subsystem is to be performed. When a predetermined period of time or more passes after the address management table is updated in advance, this can be arbitrarily determined, or this may be determined by a designation input by an operator.

When the updating processing of the address management table of the destination subsystem is not performed, the flow advances to step S56, and the address management table B 202 of subsystem B 40 held in host computer A 31 is referred to generate a known transmission packet. The transmission packet is sent to a desired destination terminal.

Figure 16B:
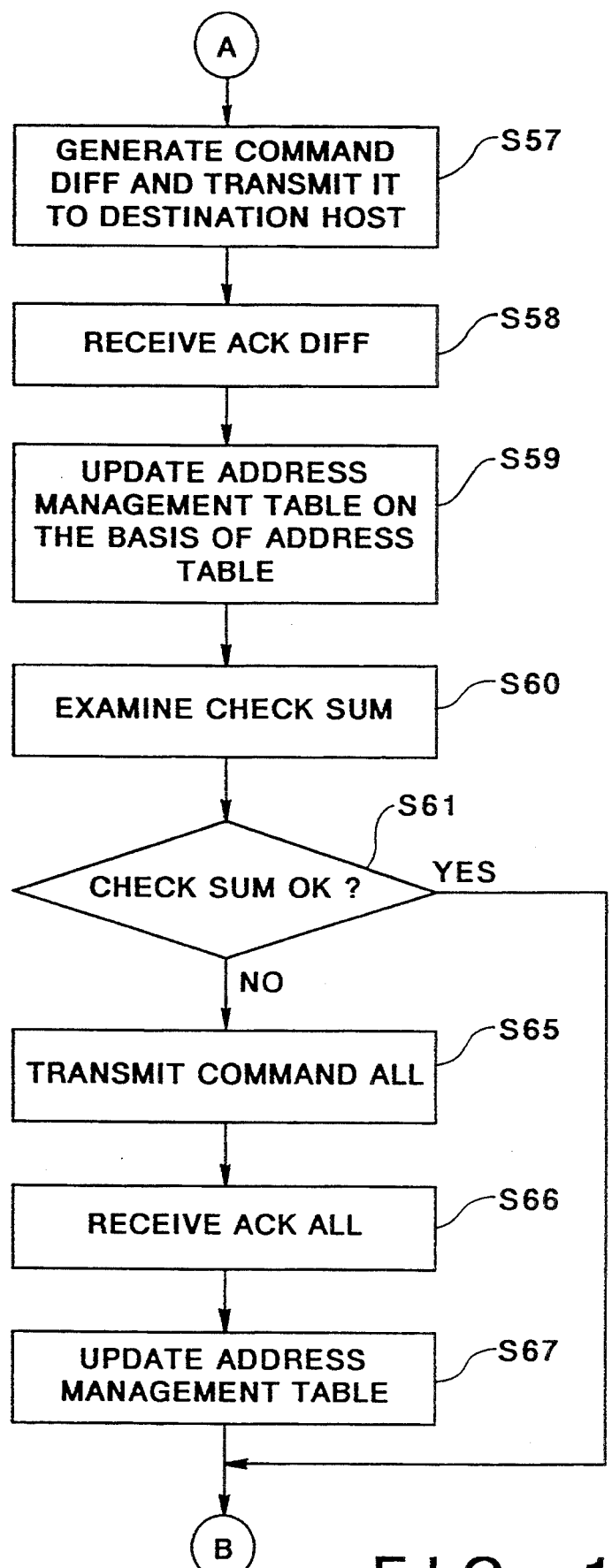

If it is determined in step S55 that the address management table is to be updated, the flow advances to step S57 in FIG. 16B. In step S57, host computer A 31 generates the "command DIFF" packet 340 and transmits it to host computer B 41. In response to this, host computer B 41 sends back the "Ack DIFF" packet 360 to host computer A 31. Host computer A 31 receives this packet in step S58 and updates the address management table therein on the basis of the address management table 355 in the received packet in step S59. In step S60, a check sum of the updated address management table B 202 is calculated. It is then checked in step S61 if the calculated value coincides with the value of the input B check sum frame 366. If a coincidence is found between the two values, this means that the address management table B 202 is correctly updated, and the flow advances to step S56 in FIG. 16A.

In this manner, upon transmission of the "command DIFF" packet, address information of a desired subsystem can be obtained. With this method, only a small communication data volume is required, and whether or not updated information is correct can be checked by a "check sum" which is sent together with the address information.

On the other hand, if the check sums do not coincide with each other in step S61, since the address management table B 202 is not correctly updated, the flow advances to the processing after step S65, and the "command ALL" packet 300 is used.

More specifically, in step S65, the "command ALL" packet 300 shown in FIG. 14A is generated, and is transmitted to the destination host computer. The destination host computer which receives this command sends back the "Ack ALL" packet 350 including all the address management tables therein as a response frame. For this reason, the source computer receives this "Ack ALL" packet 350 in step S66, and updates the corresponding address management table (address management table B) therein on the basis of the data of the address management table 355 in the received packet in step S67. The flow then advances to step S56.

On the other hand, if it is determined in step S51 that a packet is received, the flow advances to step S70 to check if the received packet is the "command DIFF" packet 340. If YES in step S70, the "Ack DIFF" packet 360 shown in FIG. 15B is generated, and is transmitted to the source host computer in step S71.

If NO in step S70, the flow advances to step S75 to check if the "command ALL" packet 300 is received. If YES in step S75, the flow advances to step S76, and the "Ack ALL" packet 350 shown in FIG. 14B is generated, and is transmitted to the source host computer.

If NO in step S75, processing corresponding to the received packet is executed in step S77.

As described above, according to the present invention, communication data includes all the address management table data in a desired subsystem and is increased. However, all the address information can be reliably obtained.

In the above description, the "check sum" is merely an example of error detection data (check code), and various other error detection data (check code) may be used as long as an error can be reliably detected. For example, error detection data such as CRC (cyclic redundancy check) data, and the like may be used.

According to the embodiment described above, address information can be updated with low communication cost, and an updating frequency can be increased in terms of cost. Thus, a change in electronic mail user registration can be quickly coped with.

According to the present invention, as described above, the entire address management table can be updated with a small communication data volume. Thus, the address management table of a desired system of the network can be updated with low communication cost, and an updating frequency can be increased in terms of cost. Thus, a change in electronic mail user registration can be quickly coped with.

As many apparently widely different embodiments of the present invention can be made without departing from the spirit and scope thereof, it is to be understood that the invention is not limited to the specific embodiments thereof except as defined in the appended claims.

What is claimed is:

1. A communication control method in a communication system in which communication is performed among a first, a second, and a third communication control apparatus, comprising:
   a first step in which the second communication control apparatus receives packet data, which may include management information of the first, the second and/or the third communication control apparatus, from the first communication control apparatus;
   a second step in which the second communication control apparatus stores the received management information of the first or the third communication control apparatus in the case where the management information of either the first or the third communication control apparatus is included in the packet data received by said receiving means;
   a third step in which the second communication control apparatus discriminates whether or not the received packet data includes the management information of the second communication control apparatus;
   a fourth step in which the second communication control apparatus deletes the management information of the second communication control apparatus from the received packet data, in the case where the packet data includes the management information of the second communication control apparatus;
   a fifth step in which the second communication control apparatus terminates the packet data without transmission thereof to another communication control apparatus in the case where, after the management information of the second communication control apparatus is deleted, no management information remains in the packet data;
   a sixth step in which the second communication control apparatus adds management information of the second communication control apparatus to the received packet data in order to provide the added management information of the second communication control apparatus to the first and the third communication control apparatus, in the case where the packet data does not include management information of the second communication control apparatus; and
   a seventh step in which, in the case where the packet data was not terminated, the second communication control apparatus transmits the received packet data, in which the management information of the second communication control apparatus was either deleted or added, to the third communication apparatus.

2. A method according to claim 1, wherein the management information is address management information of a plurality of communication terminals which are connected to said communication control apparatus.

3. A management information communication method in a communication system in which first, second, and third host computers accommodating a plurality of communication terminals are connected to each other through a wide-area network, comprising:
   a first step in which the second host computer receives packet data, which may include address information of a plurality of terminals connected to the first, the second and/or the third host computers, from the first host computer;
   a second step in which the second host computer discriminates whether or not the received packet data includes address information on the second host computer regarding a plurality of terminals connected thereto;
   a third step in which the second host computer deletes the address information on the second host computer from the received packet data in the case where the packet data includes the address information on the second host computer;
   a fourth step in which the second host computer terminates the packet data without transmission thereof to another host computer in the case where, after the address information on the second host computer is deleted no address information remains in the packet data;
   a fifth step in which the second host computer adds address information on the second host computer regarding a plurality of terminals connected thereto to the received packet data in the case where the packet data does not include address information on the second host computer in order to provide the added address information on the second host computer to the first and the third host computers; and
   a sixth step in which, in the case where the packet data was not terminated, the second host computer transmits the received packet data, in which the address information on the second host computer was either deleted or added, to the third host computer.

4. A second communication control apparatus which communicates with at least a first and a third communication control apparatus in a communication system, comprising:
   receiving means for receiving packet data, which may include management information of the first, the second and/or the third communication control apparatus, from the first communication control apparatus;
   storage means for storing the management information of the first or the third communication control apparatus in the case where the management information of the first or the third communication control apparatus is included in the packet data received by said receiving means;

discriminating means for discriminating whether or not the packet data received by said receiving means includes the management information of the second communication control apparatus;

deleting means for, in the case where said discriminating means discriminates that the packet data includes the management information of the second communication control apparatus, deleting the management information of the second communication control apparatus from the received packet data;

terminating means for, in the case where after said deleting means deletes the management information of the second communication control apparatus no management information remains in the packet data, terminating the packet data without transmission thereof to another communication control apparatus;

adding means for, in the case where said discriminating means discriminates that the packet data does not include the management information of the second communication control apparatus, adding management information of the second communication control apparatus to the received packet data in order to provide the added management information of the second communication control apparatus to the first and the third communication control apparatus; and transmitting means for, in the case where the packet data was not terminated, transmitting the received packet data, in which management information of the second communication control apparatus was either deleted by said deleting means or added by said adding means, to the third communication control apparatus.

5. An apparatus according to claim 4, wherein the management information is address management information of a plurality of communication terminals which are connected to said communication control apparatus.

6. A second communication apparatus in a communication system in which communication is performed such that the second communication apparatus is connected to at least a first and a third communication apparatus in the form of a logic ring, comprising:

management information storage means for storing management information of the first, the second, and the third communication apparatus;

receiving means for receiving a management information packet data, which may include management information of the first, the second and/or the third communication control apparatus, from the first communication control apparatus;

replacing means for replacing the management information of the first or the third communication apparatus which is stored in said management information storage means with the management information of the first or the third communication apparatus, respectively, in the received packet data;

discriminating means for discriminating whether or not the packet data received by said receiving means includes the management information of the second communication apparatus;

deleting means for, in the case where said discriminating means discriminates that the packet data includes the management information of the second communication control apparatus, deleting the management information of the second communication apparatus from the received packet data;

terminating means for, in the case where after said deleting means deletes the management information of the second communication control apparatus no management information remains in the packet data, terminating the packet data without transmission thereof to another communication control apparatus;

adding means for, in the case where said discriminating means discriminates that the packet data does not include the management information of the second communication control apparatus, adding management information of the second communication control apparatus to the received packet data in order to provide the added management information of the second communication control apparatus to the first and the third communication control apparatus; and transmitting means for, in the case where the packet data is not terminated, transmitting the received packet data, in which management information of the second communication control apparatus was either deleted by said deleting means or added by said adding means, to the third communication control apparatus.

* * * * *